May 1, 1956

T. C. ESTES ET AL 2,743,848

SALT SHAKER

Filed March 8, 1954

Thomas C. Estes
Evelyn M. Estes
INVENTORS.

BY *Clarence A. O'Brien*
*and Harvey B. Jacobson*
Attorneys

United States Patent Office 2,743,848
Patented May 1, 1956

2,743,848

SALT SHAKER

Thomas C. Estes and Evelyn M. Estes, Dallas, Tex.

Application March 8, 1954, Serial No. 414,642

4 Claims. (Cl. 222—173)

The new invention relates to new and useful improvements in shakers or dispensers particularly for salt, pepper, sugar and other granular or powdered materials and has for its primary object to provide, in a manner as hereinafter set forth, a device of this character comprising novel means for excluding moisture, dirt and other foreign matter.

Another very important object of the invention is to provide a shaker or dispenser of the aforementioned character wherein the moisture, etc., excluding means must be replaced after the device has been used.

Other objects of the invention are to provide a shaker or dispenser of the character set forth which will be comparatively simple in construction, durable, highly efficient and reliable in use, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
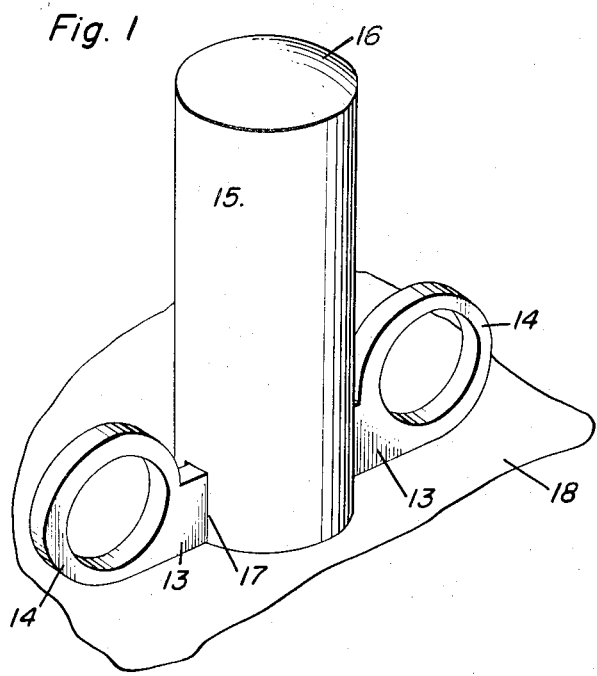
Figure 1 is a perspective view of a salt shaker constructed in accordance with the present invention.
Figure 4:
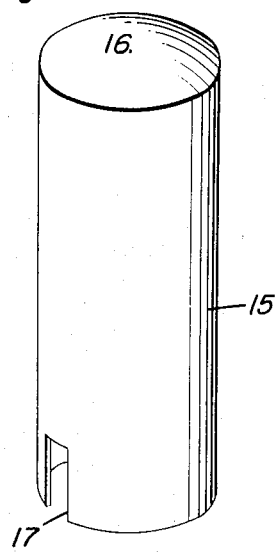
Figure 4 is a perspective view of the removable cover or shield.
Figure 3:
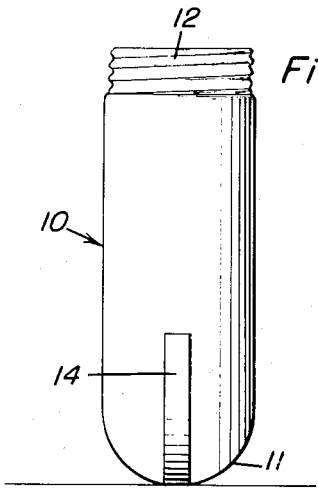
Figure 3 is an elevational view of the container, taken at right angles to Figure 2.
Figure 2:
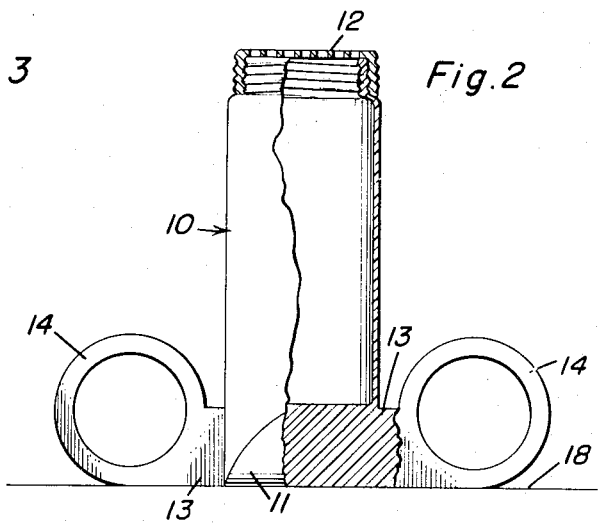
Figure 2 is a side elevational view of the device with a portion broken away in section.

Referring now to the drawing in detail, it will be seen that the embodiment of the invention which has been illustrated comprises a cylindrical container 10 of plastic or other suitable material, which container may be of any desired dimensions or capacity. The container 10 includes a substantially rounded bottom portion 11. The open top of the container 10 is closed by a removable perforated screw cap 12. Projecting in opposite directions from the lower portion of the container 10 are integral handles 13 comprising eyes or rings 14.

A removable, substantially cup-shaped cover or shield 15 is provided for excluding moisture, dirt, insects, etc., from the container 10. The cover 15 comprises a rounded top 16. Further, the cover 15 is open at its lower end and has formed vertically therein diametrically opposite slots 17 for the reception of the handles 13 when said cover is slipped downwardly over the container 10.

Figure 5:
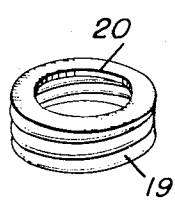
Figure 5 is a detail view in perspective of a screw cap which may be used on the container for certain materials.

It is thought that the operation or use of the device will be readily apparent from a consideration of the foregoing. Briefly, to use the shaker, the container 10 is held by either or both of the handles 13 and the cover 15 is removed therefrom. The container 10 is then inverted and shaken in an obvious manner to dispense the salt, pepper or other material. When the container 10 is replaced on the table or other supporting surface as at 18, said container is held in an upright position while the cover 15 is replaced, the slots 17 receiving the handles 13. In this manner the container 10 is maintained in an upright position. It will thus be seen that to accomplish this the cover 15 must be replaced. The shape and dimensions of the slots 17 conform to the handle members 13 to accommodate the same. In Figure 5 of the drawing there is shown a removable screw cap 19 for the container 10 which may be used in lieu of the cap 12 for dispensing certain materials, said cap 19 including a single large opening 20.

It is believed that the many advantages of a shaker constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

1. A shaker comprising: a container for mounting on a support in direct contact therewith and rockable on its bottom, a dispensing closure on the container, a slidably removable cover for the container adapted to rest on the support, and coacting means on the cover and the container for maintaining the latter in an upright position on the support.

2. A shaker comprising: a container for mounting on a support and rockable on its bottom, a dispensing closure on the container, a removable cover for the container adapted to rest on the support, and coacting means on the cover and the container for maintaining the latter in an upright position on the support, said means including members projecting from the container, said cover having slots therein for the reception of said members.

3. A shaker of the character described comprising: a container including a substantially rounded bottom portion rockable on a support, a removable cover for said container adapted to rest on the support and having vertical slots therein, and handles on the container engageable in the slots for retaining said container in an upright position on the support.

4. A shaker of the character described comprising: a cylindrical container for mounting on a support and including a substantially rounded bottom, said container being open at its top, a dispensing cap removably mounted on the container, a pair of handles including integral rings projecting in opposite directions from the lower portion of the container, and a substantially cylindrical, removable cover for the container adapted to rest on the support, said cover having open, vertical slots in its lower portion accommodating the handles for retaining the container in an upright position on the support.

References Cited in the file of this patent

UNITED STATES PATENTS

| | | |
|---|---|---|
| 225,785 | Beattie | Mar. 23, 1880 |
| 546,526 | Greene | Sept. 17, 1895 |
| 1,676,635 | Costello | July 10, 1928 |
| 2,203,880 | Schindelbeck | June 11, 1940 |
| 2,531,650 | Stagner | Nov. 28, 1950 |